US008130180B2

(12) United States Patent
Wang et al.

(10) Patent No.: US 8,130,180 B2

(45) Date of Patent: Mar. 6, 2012

(54) APPARATUS AND METHOD FOR DRIVING AN LED DISPLAY UTILIZING A PRE-PROGRAMMING PERIOD

(75) Inventors: Chen Yu Wang, Tainan County (TW); Yu Wen Chiou, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 950 days.

(21) Appl. No.: 11/621,116

(22) Filed: Jan. 9, 2007

(65) Prior Publication Data

US 2008/0165094 A1 Jul. 10, 2008

(51) Int. Cl.
*G09G 3/30* (2006.01)
*G06F 3/038* (2006.01)

(52) U.S. Cl. ............................ 345/78; 345/76; 345/215

(58) Field of Classification Search .................... 345/36, 345/39, 44–46, 76–84, 204, 214–215, 690; 315/169.3; 348/800–803
See application file for complete search history.

(56) References Cited

U.S. PATENT DOCUMENTS

| | | | | |
|---|---|---|---|---|
| 7,253,665 B2 * | 8/2007 | Kimura | ........................ | 327/108 |
| 2003/0030602 A1 * | 2/2003 | Kasai | ........................ | 345/76 |
| 2004/0008166 A1 * | 1/2004 | Kimura | ........................ | 345/76 |
| 2005/0110726 A1 * | 5/2005 | Shin | ........................ | 345/76 |

* cited by examiner

*Primary Examiner* — Bipin Shalwala
*Assistant Examiner* — Keith Crawley
(74) *Attorney, Agent, or Firm* — WPAT, P.C.; Anthony King

(57) ABSTRACT

A pixel circuit is disclosed in the present invention, which includes an OLED, a current-driving unit receiving a signal current on a data line during a programming period to provide a corresponding driving current to the OLED, a first switch coupled between the data line and the current-driving unit and turned on during the programming period to conduct the signal current, and a constant current unit providing a constant current on the data line during a pre-programming period and the programming period. The present invention also discloses an apparatus for driving a display, including a scan-driving circuit, a data-driving circuit, and plural constant current units. A method for driving a pixel having an OLED is also disclosed, which includes the steps of receiving a signal current on a data line during a programming period to provide a corresponding driving current to the OLED, and providing a constant current on the data line during a pre-programming period and the programming period.

14 Claims, 4 Drawing Sheets

APPARATUS AND METHOD FOR DRIVING AN LED DISPLAY UTILIZING A PRE-PROGRAMMING PERIOD

BACKGROUND OF THE INVENTION

1. Field of the Invention

The present invention relates to a pixel circuit and a driving method thereof, and more particularly, to a pixel circuit having an OLED (organic light-emitting diode) and a driving method thereof.

2. Description of the Related Art

Due to the potential advantages of a slim profile, wide viewing angle, fast response, high brightness, high contrast ratio, and being lightweight, OLED (organic light-emitting diode) displays promise to be an attractive display technology in the next generation. In general, a driving method for an OLED is classified into a passive matrix (i.e., PM-OLED) type and an active matrix (i.e., AM-OLED) type. The AMOLED driving method employs TFTs (thin film transistors) and storage capacitors to control the brightness and grayscale of the OLED.

The PMOLED driving method employs a simpler, cheaper circuit structure; however, the PMOLED needs high current pulses to operate to achieve the brightness that is suitable for human eyes. In addition, the brightness of the PMOLED is proportional to the current density, and thus, the operation of excessive current will degrade the lifetime and efficiency of the driving circuit.

Under the above limitations, the PMOLED is only suitable for small-sized panels such as PDAs (personal digital assistants), mobiles phones, and so on. For products with large-sized panels, the AMOLED having the properties of lower driving voltage, lower power consumption, long lifetime, faster response, and easily enhanced brightness is a better choice than the PMOLED.

The AMOLED driving method is further classified into the voltage-driving method and the current-driving method. For persons of ordinary skill in the art, the voltage-driving method suffers from the issues of mobility shift and threshold voltage shift due to variation of the manufacturing process of TFTs and the current-driving method has been developed to overcome the issues. That is, the current-driving method presents perfect compensation for the threshold voltage shift and mobility shift. However, when the size of the AMOLED panel is increasingly large, a charging problem occurs at low gray-level currents because of the large parasitic capacitive load of data lines (around 20 pF), and thus, it takes a long time to charge pixel capacitors and then the response is degraded. Therefore, it is necessary to develop a novel driving method to improve the charging ability of a conventional current-driving method.

SUMMARY OF THE INVENTION

A first aspect of the present invention is to provide a pixel circuit having an OLED, by adding a constant current unit to provide a constant current, to enhance the charging ability in a data line of the pixel circuit.

A second aspect of the present invention is to provide an apparatus for driving a display, by adding plural constant current units to provide plural constant currents in the data lines of the display, to enhance the charging ability in data lines of the display.

A third aspect of the present invention is to provide a method for driving a pixel having an OLED (organic light-emitting diode), by providing a driving current to the OLED during a programming period and providing a constant current on the data line during a pre-programming period and the programming period, to enhance the charging ability in a data line of the pixel.

According to the above aspects, the present invention discloses a pixel circuit comprising an OLED, a current-driving unit, a first switch, and a constant current unit. The current-driving unit receives a signal current on a data line during the programming period to provide a corresponding driving current to the OLED. The first switch is coupled between the data line and the current-driving unit, and is turned on during the programming period to conduct the signal current. The constant current unit provides a constant current on the data line during the pre-programming period and the programming period.

The present invention also discloses an apparatus for driving a display. The apparatus comprises a scan-driving unit, a data-driving unit, and a plurality of constant current units. The scan-driving circuit enables a row of pixel circuits of the display during the programming period. The data-driving circuit provides signal currents on data lines to drive the enabled row of pixel circuits during the programming period. Each constant current unit provides a constant current on the corresponding data line during the pre-programming period and the programming period.

In addition, the present invention discloses a method for driving a pixel is having an OLED. The method comprises the steps of receiving a signal current on a data line during the programming period to provide a corresponding driving current to the light-emitting diode, and providing a constant current on the data line during the pre-programming period and the programming period.

BRIEF DESCRIPTION OF THE DRAWINGS

The invention will be described according to the appended drawings in which.

DETAILED DESCRIPTION OF THE INVENTION

Figure 1:
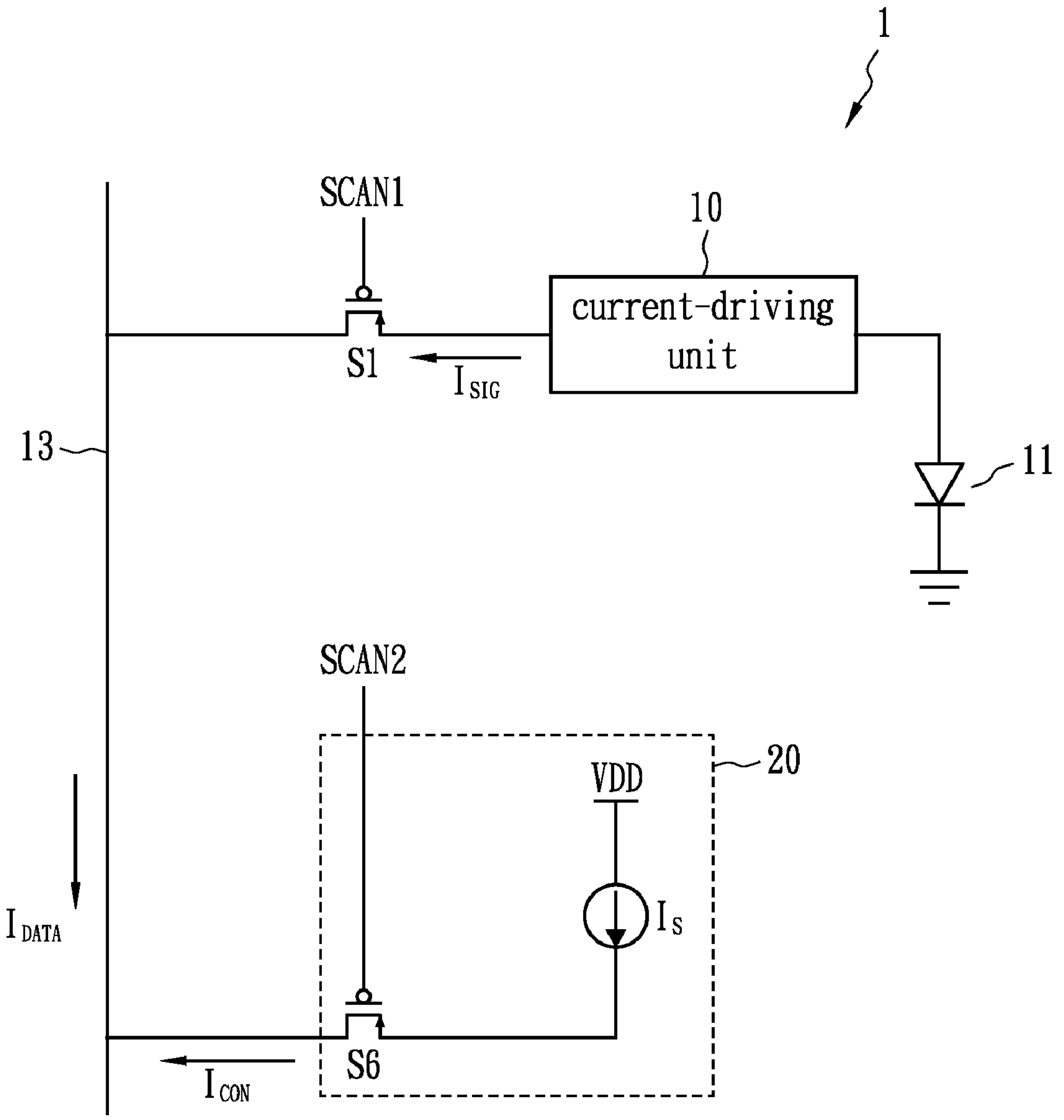
FIG. 1 shows an embodiment of the pixel circuit according to the present invention.

FIG. 1 shows an embodiment of a pixel circuit 1 according to the present invention. The pixel circuit 1 includes an OLED 11, a current-driving unit 10, a first switch S1 controlled by a signal SCAN1, and a constant current unit 20. The current-driving unit 10 receives a signal current $I_{SIG}$ on a data line to provide a corresponding current (not shown) to the OLED 11. The first switch S1 is coupled between the data line 13 and the current-driving unit 10, and is turned on to conduct the signal current $I_{SIG}$. The constant current unit 20 provides a constant current $I_{CON}$ on the data line 13. The constant current unit 20 includes a constant current source $I_S$, and a sixth switch S6 coupled between the constant current source $I_S$ and the data line 13.

Figure 2:
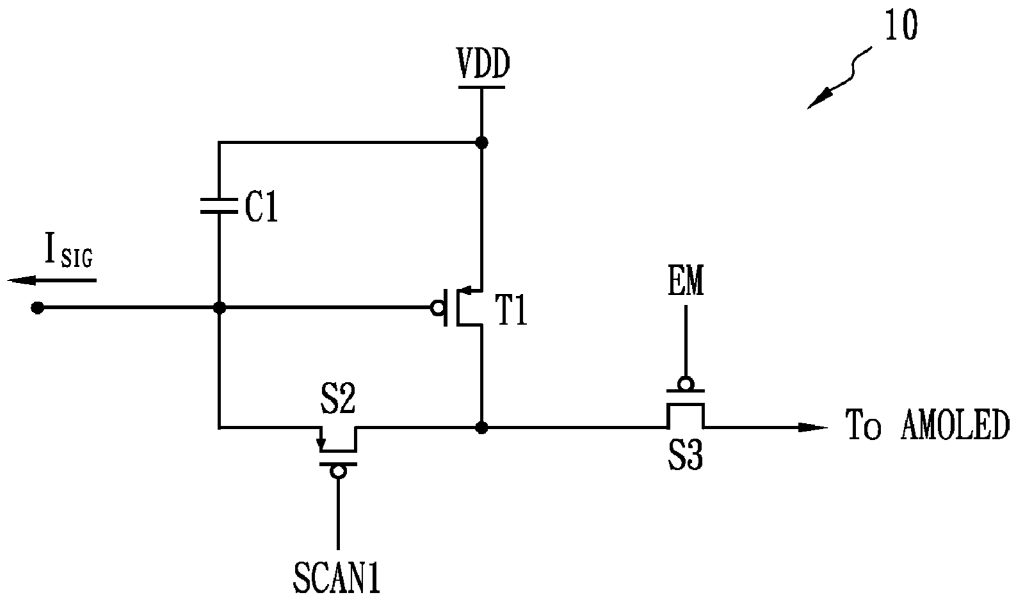
FIG. 2 shows an embodiment of the current-driving unit.

FIG. 2 shows an embodiment of the current-driving unit 10. The current-driving unit 10 includes a driving transistor T1, a second switch S2, a capacitor C1, and a third switch S3. The driving transistor T1 has a source coupled to receive a supply voltage VDD and a gate coupled to the first switch S1.

The second switch S2 is coupled between a drain and the gate of the driving transistor T1. The capacitor C1 is coupled between the source and the gate of the driving transistor T1. The third switch S3 is coupled between the driving transistor T1 and the OLED 11. The driving transistor T1, the second switch S2 and the third switch S3 could be PMOS transistors.

Figure 3:
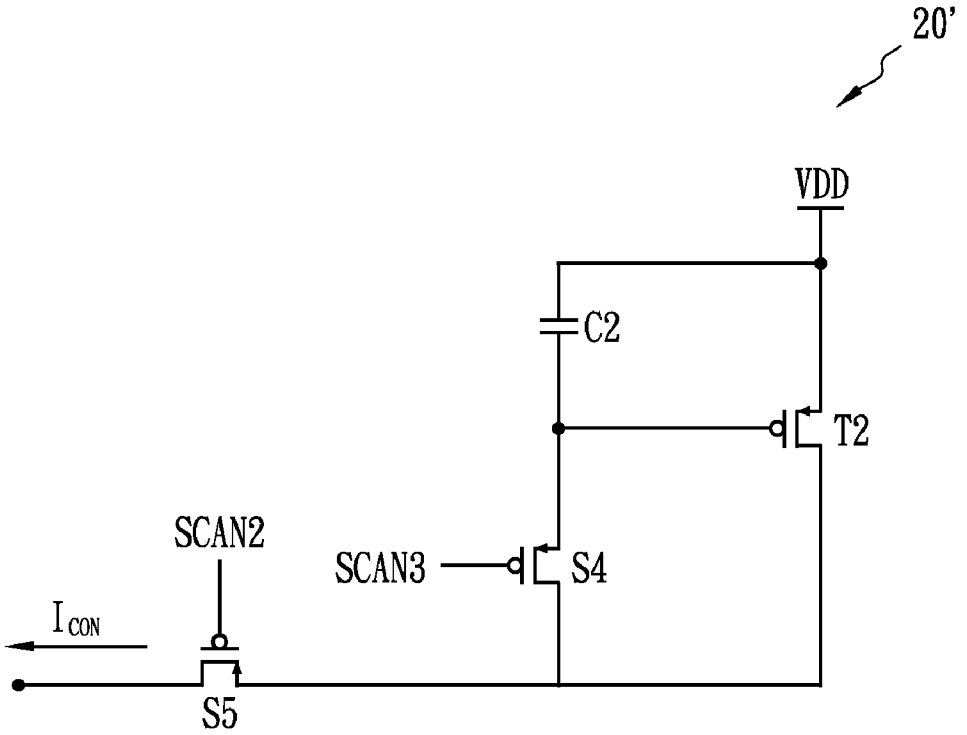
FIG. 3 shows another embodiment of the constant current unit.

FIG. 3 shows another embodiment of the constant current unit 20'. The constant current unit 20' includes a transistor T2, a capacitor C2, a fourth switch S4, and a fifth switch S5. The transistor T2 has a source coupled to receive the supply voltage VDD. The capacitor C2 is coupled between the source and the gate of the transistor T2. The fourth switch S4 is coupled between the gate and a drain of the transistor T2. The fifth switch S5 is coupled between DATA_LINE and the drain of the transistor T2.

Figure 4:
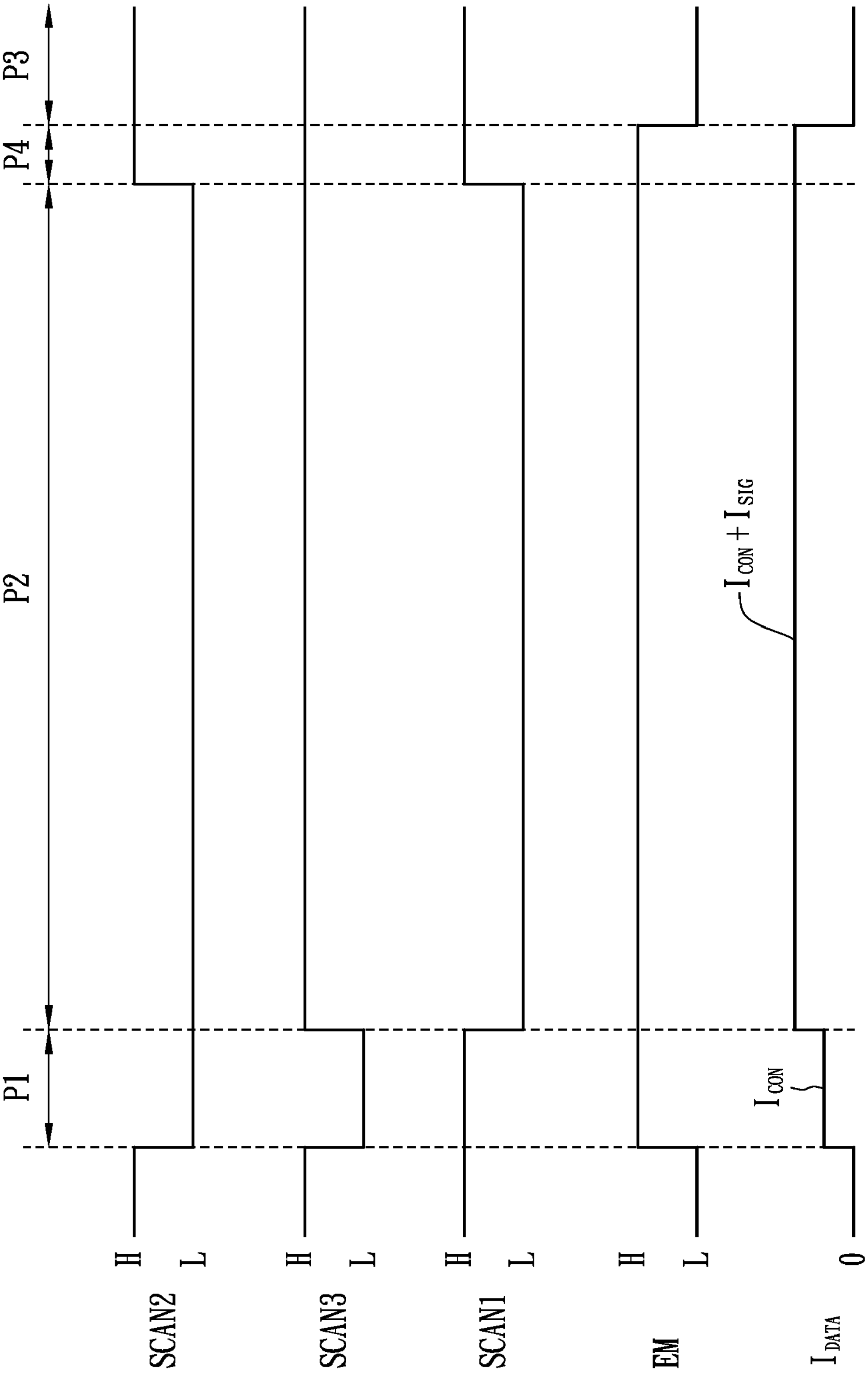
FIG. 4 is a timing chart regarding related signals of FIG. 1.

FIG. 4 shows the timing chart of signals SCAN1, SCAN2, SCAN3, EM, and $I_{DATA}$. Referring to FIG. 1, the signal SCAN2 has a low logic level turning on the sixth switch S6 during both a pre-programming period P1 and a programming period P2 so that the constant current unit 20 conducts the constant current $I_{CON}$ on the data line 13. The signal SCAN1 has a low logic level turning on the switch S1 during the programming period P2 so that the current driving unit 10 conducts the signal current $I_{SIG}$ on the data line 13. Therefore, the data line 13 carries a constant current $I_{CON}$ during the pre-programming period P1 and a current of $I_{CON}+I_{SIG}$ during the programming period P2. During an emission period P3, the signal EM has a low logic level turning on the third switch S3 so that a driving current corresponding to the signal current $I_{SIG}$ flows through the OLED 11 (refer to FIGS. 1 and 2). A period P4 could be optionally inserted between the programming period P2 and the emission period P3 to achieve a stable charging state before the driving current flows to the OLED 11. Thus, the period during which the constant current $I_{CON}$ is provided overlaps with the period during which the signal current $I_{SIG}$ is provided. The period for the constant current $I_{CON}$ starts before the period for the signal current $I_{SIG}$ starts, but ends at the end thereof. The driving current is provided during a period following that for the signal current $I_{SIG}$.

Referring to FIGS. 3 and 4, the signal SCAN3 has a low logic level turning on the fourth switch S4 during the pre-programming period P1 so that the capacitor C2 is charged by the voltage difference between the source and the gate of the transistor T2, which is determined by the constant current $I_{CON}$ flowing through the transistor T2 working in the saturation region. During the programming period P2, the level of the signal SCAN 3 switches to a high logic level turning off the fourth switch S4 and a driving current corresponding to the constant current $I_{CON}$ flows through the transistor T2 to the data line 13.

Figure 5:
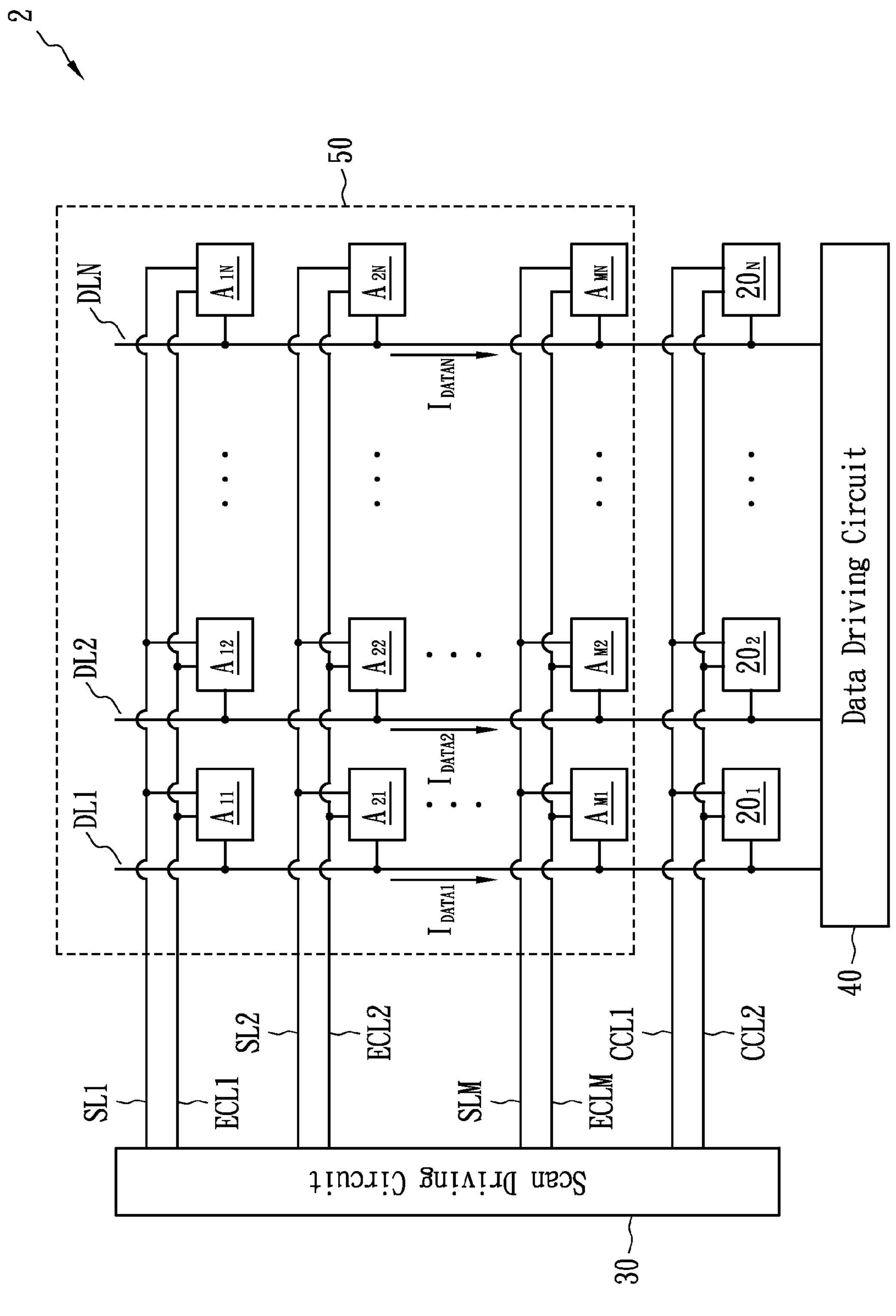
FIG. 5 shows an embodiment of the apparatus for driving a display according to the present invention.

FIG. 5 shows an embodiment of the apparatus 2 for driving a display according to the present invention. The apparatus 2 for driving a display 50 includes a scan-driving circuit 30, a data-driving circuit 40, and a plurality of constant current units $20_1$-$20_N$. The scan-driving circuit 30 enables a row of pixel circuits $A_{11}$-$A_{MN}$ of the display 50 during the programming period P2 through plural select signals SL1-SLM (in the current embodiment, the select signals SL1-SLM correspond to the signal SCAN1 in FIG. 1). The data-driving circuit 40 provides signal currents on data lines DL1-DLN to program the enabled row of pixel circuits during the programming period. Each of the constant current units $20_1$-$20_N$ provides a constant current on one of the data lines DL during the pre-programming period P1 and the programming period P2. In the current embodiment, each of the pixel circuits $A_{11}$-$A_{MN}$ could be the pixel circuit 1 of FIG. 1 excluding the constant current unit 20. That is, each of the pixel circuits $A_{11}$-$A_{MN}$ includes an OLED, a current-driving unit receiving a signal current on one of the data lines DL1-DLN during the programming period P2 to provide a corresponding driving current during the emission period P3 to the OLED, and a first switch coupled between one of the data lines DL1-DLN and the current-driving unit, and turned on by the scan-driving circuit during the programming period P2 to conduct the signal current. The operation of each pixel circuit of the display 50 follows the timing chart of FIG. 4. The select signal SL (i.e., each of SL1-SLM) and the signal ECL (i.e., each of ECL1-ECLM) of FIG. 5 are equivalent to the signals SCAN1 and EM of FIG. 2, respectively. The signals CCL1 and CCL2 of FIG. 5 are equivalent to the signals SCAN2 and SCAN3 of FIG. 3, respectively. The pixel circuits $A_{11}$-$A_{MN}$ emit light according to the signal currents during the emission period P3.

In the above embodiments, by inclusion of the constant current units providing the constant current on the data line during the programming period, the charging problem associated with large parasitic capacitive load of data lines of a large-size OLED panel is overcome.

The above-described embodiments of the present invention are intended to be illustrative only. Numerous alternative embodiments may be devised by those skilled in the art without departing from the scope of the following claims.

What is claimed is:

1. A pixel circuit comprising:

a light-emitting diode;

a current-driving unit receiving a signal current on a data line only during a programming period to provide a corresponding driving current to the light-emitting diode;

a first switch coupled between the data line and the current-driving unit, and turned on only during the programming period to conduct the signal current; and a constant current unit providing a constant current on the data line continuously from a pre-programming period to the programming period;

wherein a level of the constant current is the same during the pre-programming period and the programming period;

wherein the programming period follows the end of the pre-programming period;

wherein the constant current during the pre-programming period is lower than a sum of the signal current and the constant current during the programming period.

2. The pixel circuit of claim 1, wherein the driving current is provided during an emission period following the programming period.

3. The pixel circuit of claim 2, wherein the current-driving unit comprises:

a driving transistor having a source coupled to receive a supply voltage and a gate coupled to the first switch;

a second switch coupled between a drain and the gate of the driving transistor;

a capacitor coupled between the source and gate of the driving transistor; and a third switch coupled between the drain of the driving transistor and the light-emitting diode;

wherein the second switch is turned on during the programming period and the third switch is turned on during the emission period.

4. The pixel circuit of claim 1, wherein the constant current unit comprises:

a transistor having a source coupled to receive a supply voltage;

a capacitor coupled between the source and a gate of the transistor;

a fourth switch coupled between the gate and a drain of the transistor; and a fifth switch coupled between the data line and the drain of the transistor;

wherein the fourth switch is turned on during the pre-programming period, and the fifth switch is turned on during the pre-programming period and the programming period.

5. The pixel circuit of claim 1, wherein the constant current unit comprises:

a constant current source; and a sixth switch coupled between the constant current source and the data line, and turned on during the pre-programming period and the programming period.

6. An apparatus for driving a display, comprising:

a scan-driving circuit enabling a row of pixel circuits of the display during a programming period;

a data-driving circuit providing signal currents on data lines to drive the enabled row of pixel circuits only during the programming period; and a plurality of constant current units, each providing a constant current on one of the data lines continuously from a pre-programming period to the programming period;

wherein a level of the constant current is the same during the pre-programming period and the programming period;

wherein the programming period follows the end of the pre-programming period;

wherein the constant current during the pre-programming period is lower than a sum of the signal current and the constant current during the programming period.

7. The apparatus of claim 6, wherein the pixel circuits selectively emit light according to the signal currents during an emission period following the programming period.

8. The apparatus of claim 7, wherein each of the pixel circuits comprises:

a light-emitting diode;

a current-driving unit receiving a signal current on one of the data lines during the programming period to provide a corresponding driving current to the light-emitting diode; and a first switch coupled between one of the data lines and the current-driving unit, and turned on by the scan-driving circuit during the programming period to conduct the signal current.

9. The apparatus of claim 8, wherein the current-driving unit comprises:

a driving transistor having a source coupled to receive a supply voltage and a gate coupled to the first switch;

a second switch coupled between a drain and a gate of the driving transistor;

a capacitor coupled between the source and the gate of the driving transistor; and a third switch coupled between the drain of the driving transistor and the light-emitting diode;

wherein the second switch is turned on during the programming period and the third switch is turned on during the emission period.

10. The apparatus of claim 9, wherein the first switch, the driving transistor, the second switch and the third switch are PMOS transistors.

11. The apparatus of claim 6, wherein each of the constant current unit comprises:

a transistor having a source coupled to receive a supply voltage;

a capacitor coupled between the source and a gate of the transistor;

a fourth switch coupled between the gate and a drain of the transistor; and a fifth switch coupled between one of the data lines and the drain of the transistor;

wherein the fourth switch is turned during the pre-programming period, and the fifth switch is turned on during the pre-programming period and the programming period.

12. The apparatus of claim 6, wherein each of the constant current units comprises:

a constant current source; and a sixth switch coupled between the constant current source and one of the data lines, and turned on during the pre-programming period and the programming period.

13. A method for driving a pixel having a light-emitting diode, the method comprising the steps of:

receiving a signal current on a data line only during a programming period to provide a corresponding driving current to the light-emitting diode; and providing a constant current on the data line continuously from a pre-programming period to the programming period;

wherein a level of the constant current is the same during the pre-programming period and the programming period;

wherein the programming period follows the end of the pre-programming period;

wherein the constant current during the pre-programming period is lower than a sum of the signal current and the constant current during the programming period.

14. The method of claim 13, wherein the driving current is provided during an emission period following the programming period.

* * * * *